United States Patent [19]

Schaefgen

[11] 4,118,372
[45] Oct. 3, 1978

[54] AROMATIC COPOLYESTER CAPABLE OF FORMING AN OPTICALLY ANISOTROPIC MELT

[75] Inventor: John Raymond Schaefgen, Wilmington, Del.

[73] Assignee: E. I. Du Pont de Nemours and Company, Wilmington, Del.

[21] Appl. No.: 596,237

[22] Filed: Jul. 16, 1975

Related U.S. Application Data

[63] Continuation-in-part of Ser. No. 468,697, May 10, 1974, abandoned.

[51] Int. Cl.² .............................................. C08G 63/18

[52] U.S. Cl. ................................... 528/190; 528/191; 528/192 M; 528/193

[58] Field of Search ................................ 260/47 C, 61

[56] References Cited

U.S. PATENT DOCUMENTS 3,975,487   8/1976   Cottis et al. ...................... 264/210 F Primary Examiner—Lester L. Lee

[57] ABSTRACT

This invention relates to a class of synthetic polyesters and copolyesters which display optical anisotrophy in the molten state and to the fibers, films, and other shaped articles obtained from the optically anisotropic melts.

20 Claims, 1 Drawing Figure

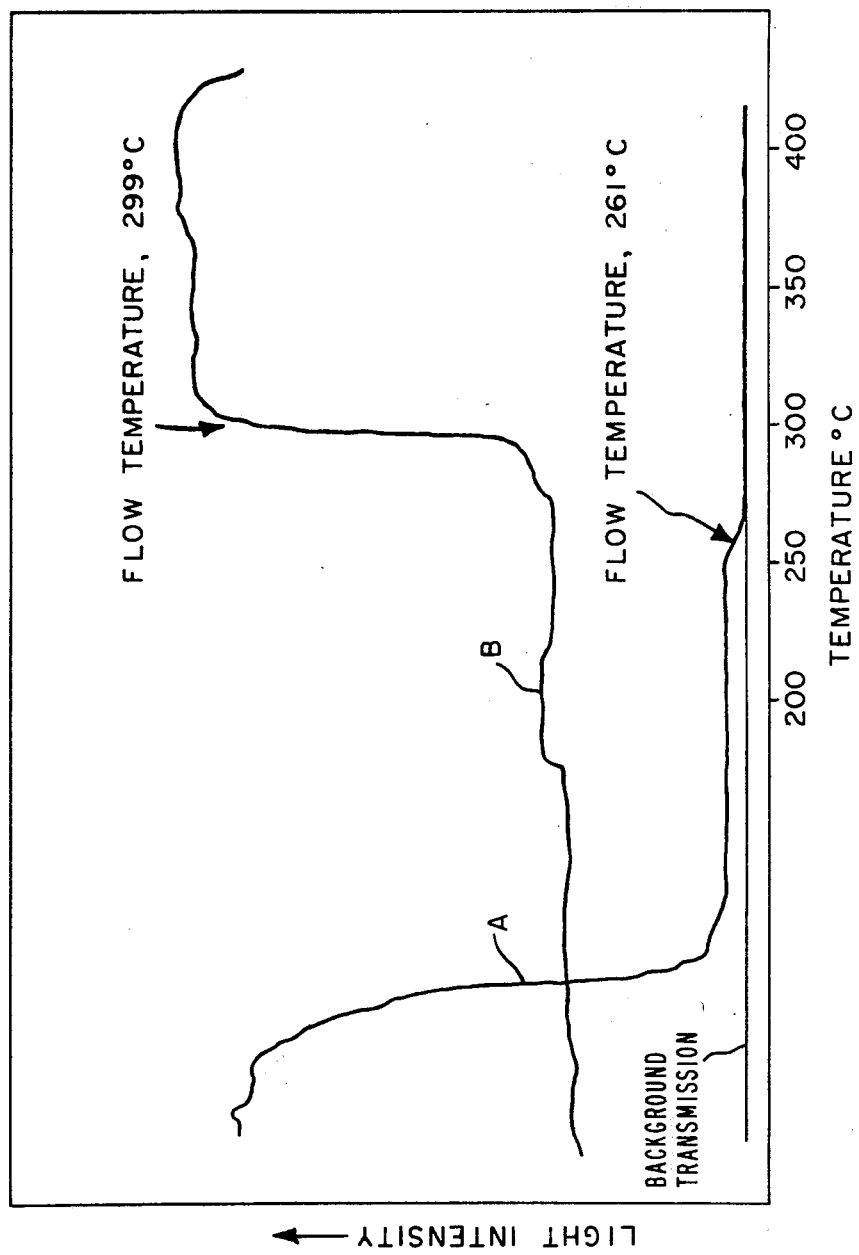

4,118,372

AROMATIC COPOLYESTER CAPABLE OF FORMING AN OPTICALLY ANISOTROPIC MELT

CROSS-REFERENCE TO RELATED APPLICATION

This application is a continuation-in-part of my application Ser. No. 468,697, filed May 10, 1974 and now abandoned.

BACKGROUND OF THE INVENTION

Optical anisotropy is known in the art for dopes (or solutions) of synthetic polyamides, e.g., the dopes of Kwolek U.S. Pat. No. 3,671,542. Liquid crystal behavior is reported for polyolefin melts in, e.g., SPE Transactions, January, 1965, pp. 15-21 and in Kolloid-Zeitschrift and Zeitschrift für Polymere, 250, 27-37 (1972). Optical anisotropy has not been reported for melts of polyesters before this invention.

Poly(ethylene terephthalate), the polyester most commonly used for commercial fiber production, is melt-spun and then drawn to induce orientation and increase its strength. The provision of novel polyesters which can be melt spun directly into useful oriented fibers without the need for afterdrawing is a desirable objective.

SUMMARY OF THE INVENTION

This invention provides novel, melt-spinnable fiber-forming synthetic polyesters and coopolyesters preferably having a flow temperature of at least 200° C. and which are capable of forming optically anisotropic melts and oriented fibers spun from these melts. Many of these fibers show increased orientation and tenacity, and frequently modulus, when heated in an essentially relaxed condition at temperatures in excess of 200° C., preferably above 250° C, and below the fiber flow temperature. Other shaped articles such as films and bars may be prepared from the polymers.

DRAWINGS

The FIGURE depicts intensity traces obtained as described herein for two different polyesters in the solid and melt states along with the background trace. One of the trace curves (B) is of a polyester of the invention while the other trace curve (A) is of a polymer which yields an isotropic melt.

DESCRIPTION OF THE PREFERRED EMBODIMENTS

Polyesters and Copolyesters the (co)polyesters of the invention consist essentially of recurring structural units selected from the group (I) +O—R$_1$—O+ and
(II) +OC—R$_2$—CO+
and/or
(III) +O—R$_3$—CO+ wherein units I and II, if present, are present in substantially equimolar amounts; R$_1$, R$_2$ and R$_3$ are radicals selected from the group of 1) single and fused 6-membered aromatic carbocyclic ring systems wherein the chain-extending bonds of the ring system if attached to the same ring are positioned 1,4- to each other, and if attached to different rings, are in positions parallel and oppositely directed, and 2) multiple 6-membered aromatic carbocyclic ring systems in which the individual rings are joined by a chemical bond or a trans-vinylene group and in which the chain extending bonds of each ring are in the 1,4-positions; R$_2$ may also be

and
R$_3$ may also be

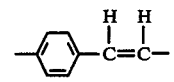

wherein the aliphatic portion is attached to the carbonyl group. Preferred group 1) radicals are phenylene and naphthylene. Preferred group 2) radicals are two-ring systems. Illustrative of 1) are

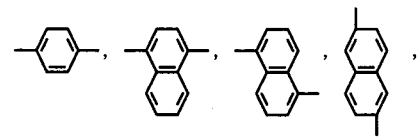

and of 2) are

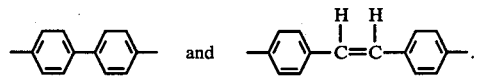

The foregoing ring systems, except for R$_2$, as indicated below, are also intended to include one or more substituents, e.g., chloro, bromo, fluoro, or lower alkyl (1-4 carbon atoms) on the ring or rings. The R$_2$ aromatic ring systems should be unsubstituted when only one kind of unit I and one kind of unit II are used, i.e., when a homopolymer is formed to insure obtaining oriented fibers. In the case of copolymers, it is preferred that the R$_2$ aromatic ring systems be unsubstituted because of thermal or hydrolytic instability and/or cost of the R$_2$-ring substituted copolymers.

Also included in the invention are those (co)polyesters wherein up to 25 mol %, preferably up to 5 mol %, based on the total I, II and III units, are aromatic polymer-forming units (i.e., units wherein the chain extending functional groups are attached to aromatic rings) not conforming to those described above and which do not interfere with the anisotropic melt forming capability of the polymers. Where formula I or II are replaced, the formula I units and their replacements and the formula II units and their replacements are present in substantially equimolar amounts. A non-limiting list of these units includes

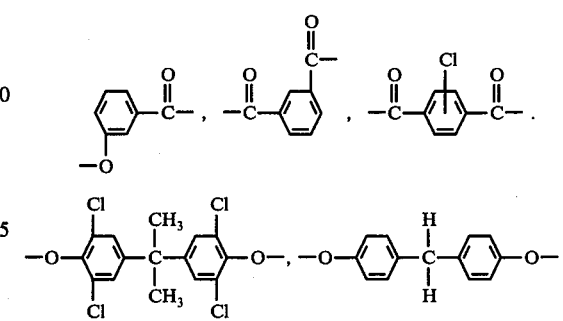

-continued

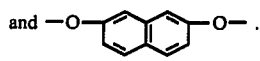

The (co)polyesters, as mentioned above, may comprise units I and II in substantially equimolar amounts or may comprise units III or may comprise a combination of units I, II, and III and, of course, more than one kind of unit (I, II and/or III) can be present in the polymer.

Preferred (co)polyesters of the invention consist essentially of units I and II. In such polymers, it is preferred that $R_1$ is selected from the group of 1,4-phenylene; chloro-, dichloro-, bromo-, dibromo-, methyl-, dimethyl- and fluoro-1,4-phenylene; 4,4'-biphenylene; 3,3',5,5'-tetramethyl-4,4'-biphenylene and $R_2$ is selected from the group of trans-1,4-cyclohexylene; trans-2,5-dimethyl-1,4-cyclohexylene; trans-vinylenebis(1,4-phenylene); 4,4'-biphenylene; 2,6-naphthylene; and 1,4-phenylene and with the proviso that more than one kind of unit I or II are present. Of such copolyesters, two types are particularly preferred because of properties and cost. In the first type, the polymers consist essentially of the recurring units

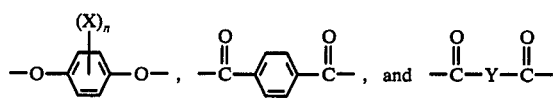

wherein X is selected from the group of chloro-, bromo-, fluoro-, and methyl radicals; n is 1 or 2; and Y is selected from the group of 4,4'-biphenylene and 2,6-naphthylene, the ratio of

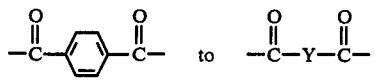

units being within the range of 4:1 to 1:4. In the second type, the polymers consist essentially of the recurring units

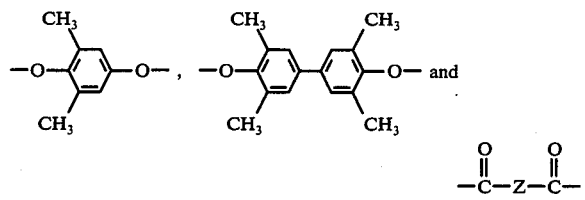

wherein Z is selected from the group of 4,4'biphenylene, 2,6-naphthylene, and 1,4-phenylene, the ratio of

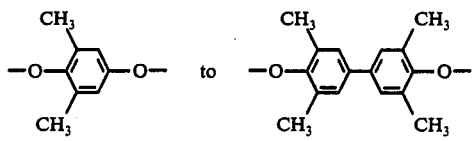

units being within the range of 4:1 to 3:2. With each type of polymer, up to 25 mol % of non-conforming units may be present as described above.

Of the (co)polyesters containing only III units, the polymers consisting essentially of the recurring units

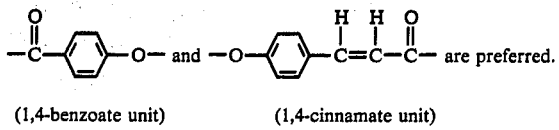

(1,4-benzoate unit)   (1,4-cinnamate unit)

The (co)polyesters may be prepared from appropriate dicarboxylic acids and dihydric phenols and/or phenolic-carboxylic acids or their derivatives.

USEFUL MONOMERS AND COMONOMERS

Dihydric phenols which may be used for preparing the polyesters and copolyesters useful in this invention include fluorohydroquinone; chlorohydroquinone; methylhydroquinone; bromohydroquinone; hydroquinone; dibromohydroquinone; dimethylhydroquinone; dichlorohydroquinone; 4,4'-dihydroxybiphenyl; 3,3',5,5'-tetramethyl-4,4'-dihydroxybiphenyl; tertiary butylhydroquinone and the like. Phenolic reactants are used preferably in the derivative form such as the corresponding diacetates or diisobutyrates. Useful acids are terephthalic acid; 2,5-dichloroterephthalic acid; 4,4'-bibenzoic acid; hexahydroterephthalic acid; 1,4- and 2,5-dimethyl-transhexahydroterephthalic acid; 4,4'-stilbenedicarboxylic acid; 2,6-naphthalenedicarboxylic acid and the like.

Useful phenolic-carboxylic acid derivatives include p-acetoxybenzoic acid and p-acetoxycinnamic acid and the like.

It should be understood that not all combinations of reactants mentioned above will produce useful optically anisotropic melts. Those producing polymers with flow temperatures in excess of 375° C should be avoided, as such high melting products are difficult to process (e.g., spin into useful fibers). Depending on structure, rapid decomposition of the (co)polyesters occurs at higher temperatures, i.e., above 375° C.

Illustrated in the examples are numerous polyesters and copolyesters which are within the scope of the present invention. A nonlimiting list of other species is given below. Among these are: poly(methyl-1,4-phenylene 2,5-dimethyl-trans-hexahydroterephthalate); copoly(methyl-1,4-phenylene trans-hexahydroterephthalate/terephthalate) (8/2); copoly(chloro-1,4-phenylene trans-hexahydroterephthalate/isophthalate) (9/1) and (8/2); copoly(ethyl-1,4-phenylene terephthalate/2,6-naphthalate) (7/3); copoly (tert. butyl-1,4-phenylene/3,3',5,5'-tetramethyl-4,4'-biphenylene terephthalate) (7/3); copoly(chloro-1,4-phenylene/3,3',5,5'-tetrachloro-4,4'-biphenylene terephthalate) (7/3), copoly(methyl-1,4-phenylene/2,7-naphthylene terephthalate) (7/3) and the like.

The polyesters and copolyesters of this invention preferably have a flow temperature in the range of 200° C to 375° C and a molecular weight sufficient for them to exhibit fiber-forming properties. In the case of soluble polymers, inherent viscosities of at least 0.3 to 4 or higher, measured as described hereinafter, are useful for shaped articles. Too high a molecular weight leads to spinning problems because of high melt viscosity.

With polymers that are insoluble in the solvent used for determining inherent viscosity, the fiber-forming potential may be demonstrated by melting a chip of polymer in the anisotropic melt-forming temperature range on a heated bar (e.g., a modified Dennis bar, See Sorenson, W. and Campbell, T. W. "Preparative Methods of Polymer Chemistry", Interscience Publishers, Inc., New York, 1961, p. 49–50), and slowly (~1 ft/sec) withdrawing fibers from the melted pool.

POLYMERIZATION CONDITIONS

The polyesters and copolyesters may be prepared from appropriate monomers by melt polymerization techniques, preferably under anhydrous conditions in an inert atmosphere. For example, equimolar amounts of the reactant acid and the diacetate of the dihydric phenol are combined in a reaction vessel equipped with a stirrer, nitrogen inlet tube, and combined distillation head-condenser (to facilitate by-product removal). The reaction vessel and other equipment are dried and purged with nitrogen prior to use. The vessel and stirred contents, maintained under nitrogen, are heated during which time the reactants polymerize and the by-product (acetic acid) is removed via the distillation head-condenser and is collected. When the polymerization appears nearly complete, as indicated by the amount of acetic acid collected remaining constant, the molten mass is placed under reduced pressure (e.g., 1 mm. Hg or less) and is heated, under nitrogen, at a higher temperature to facilitate removal of the remaining acetic acid and to complete the polymerization. The melt may then be removed, cooled, and allowed to solidify prior to purification and/or subsequent processing. Optionally, the molten polymer may be transferred directly to an appropriate apparatus for preparation of shaped articles, e.g., a fiber spinning unit.

For smaller scale synthesis, e.g., in a polymer melt tube, agitation may be accomplished by passing a stream of inert gas through the melt. However, mechanical stirring is preferred.

Polymerization conditions may be varied according to, e.g., the reactants employed, and the degree of polymerization desired.

ANISOTROPIC MELTS

The anisotropy of these polyesters and copolyesters in the molten state facilitates attainment of high orientation, strength, high initial modulus, and/or low shrinkage of fibers prepared from the melts, and also contributes to the capacity of some of these fibers to increase in tenacity on heat treatment in an essentially relaxed state. The melts are believed to comprise domains of parallel aligned polymer chains. The melts of the invention produce as-spun oriented fibers in conventional melt-spinning processes.

Optical anisotropy of the (co)polyester melts can be determined by modification of known procedures. It is well known that translucent optically anisotropic materials cause light to be transmitted in optical systems equipped with crossed polarizers [see, e.g., S. A. Jabarin and R. S. Stein, J. Phys. Chem., 77, 399 (1973)], whereas transmission of light is theoretically zero for isotropic materials. Thus, optical anistropy can be determined by placing a sample of the polymer on a heating stage of a polarizing microscope and bringing the temperature up to and beyond the polymer flow temperature. If the polymer is optically anisotropic in the melt, a bright field will be observed at temperatures above the polymer flow temperature. This may be confirmed through use of the thermo-optical test (TOT) described below. The apparatus is similar to that described by I. Kirshenbaum, R. B. Isaacson, and W. C. Feist, Polymer Letters, 2, 897–901 (1964).

SHAPED ARTICLE PREPARATION

The (co)polyesters of this invention are formed into useful shaped articles such as fibers, films, bars, or other molded objects, etc. by, e.g., pressing or by spinning, casting, or extruding the anisotropic melts thereof. Especially preferred are the highly oriented, strong fibers. For fiber preparation the moltem polymer mass, obtained either directly from the melt polymerization of the (co)polymer-forming ingredients or via the melting of a plug or block of (co)polymer, is processed, e.g., through a melt spinning unit and extruded through a spinneret into a quenching atmosphere (e.g., air maintained at room temperature) and wound up. As used herein, the term "as-spun fiber" refers to a fiber which has not been drawn, stretched, or heat treated after extrusion and normal windup. In fact, the "as-spun" fibers of the anisotropic melts cannot be drawn in the usual sense, i.e., 100% or more.

Fibers may be prepared conveniently from single or multi-hole spinnerets. In the melt spinning cell, the temperatures to be maintained in the melt zone and at the spinneret will vary, of course, depending on the polymer being spun. Filtering screens and discs may be employed in the spinneret pack. Air or nitrogen may used as a quenching medium for the fibers leaving the spinneret. The as-spun fibers may be wound up at varying speeds, e.g., from less than 100 yd/min to 1,750 yd/min or higher. Spin stretch factor (SSF, defined hereinafter) varies with spinneret hole size and may range from 5 to 400. If desired, a finish may be applied to the as-spun fibers.

Films may be prepared by conventional melt-extrusion techniques. Especially valuable also are molded or extruded objects, such as bars, which may be prepared by conventional means. The relatively low viscosity of the melts is of advantage in processing. There usually is more orientation in the extruded bars than in the molded bars.

FIBERS, FILMS, BARS: PROPERTIES, HEAT TREATMENT, UTILITY

The as-spun fibers of this invention are oriented, having orientation angles of less than 65°. In addition, many as-spun samples exhibit desirable levels of tensile and other properties. For example, many as-spun fibers are characterized by a tenacity of at least 3 gpd., an initial modulus in excess of 100 gpd (and often exceeding 200 gpd), and an X-ray orientation angle of less than about 40°. In addition, many show resistance to acid and alkaline media and show good retention of tensile properties at elevated temperatures.

These fibers are useful as in, e.g., ropes, and in fiber-reinforced plastics, and other industrial applications.

The as-spun fibers of this invention may be subjected to a novel heat treatment which increases their tenacity. Some of the fibers reach such high levels of tensile properties as to make them useful for tire reinforcement. Surprisingly, heat treatment of the fibers in an essentially relaxed state, e.g., in skeins or on soft covered (Fiber-Frax ®) bobbins, or in a loose pile at temperatures in excess of 200° C and below the fiber flow temperature (but preferably within 20° C thereof) will accomplish this result. Heating temperatures should be kept below that at which substantial interfilament fusion occurs. The heat treatment should preferably be conducted in a stream of inert gas. Nitrogen is quite suitable for this purpose.

A strong film was prepared from an anisotropic melt of poly(chloro-1,4-phenylene hexahydroterephthalate) by melt extrusion at 303°-310° C in a Sterling extruder through a slot of dimensions 3 in × 3 mils (8 cm × 0.08 mm); the film was pulled into water and wound up. After successive heat treatments in a stream of nitrogen at 170° C/3 hours, 230° C/16 hours, 260° C/22 hours, 285° C/7 hours and 260° C/64 hours, the cooled film was of thickness 0.04 mm and had tensile strength/elongation/modulus of 110,000 psi/3.5%/2,950,000 psi (7,700 kg/sq cm/3.5%/207,000 kg/sq cm). The film tensile properties are measured by the method of U.S. Pat. No. 3,627,579, column 10. The films may be used for strapping applications.

Bars molded from the preferred compositions of this invention have outstanding stiffness and toughness as measured by flexural modulus (ASTM-D-790, Method 1, Proc. A) and notched Izod impact strength (ASTM-D-256, Method A), respectively. For example, a bar of copoly(chloro-1,4-phenylene terephthalate/1,4-cinnamate) (1/2) has exhibited a flexural modulus of 842,000 lb/in$^2$ and a notched Izod impact strength of 0.75 ft-lb inch of notch; an injection molded ⅛ inch-thick bar of copoly(chloro-1,4phenylene terephthalate/2,6-naphthalate) (70/30) has exhibited an average flexural modulus of about 1,760,000 lb/in$^2$, flexural strength of 31,400 lb/in$^2$ and notched Izod impact strength of about 5.0 ft-lb per inch of notch; poly(chloro-1,4-phenylene hexahydroterephthalate) bars have exhibited a flexural modulus of 580,000 lb/in$^2$ and a notched Izod impact strength of 2.2 ft-lb per inch of notch. An extruded rod (0.1 in. diam) of copoly(1,4-benzoate/1,4-cinnamate) (1/1) has exhibited a flexural modulus of 1,340,000 lb/in$^2$ and shows orientation by X-ray analysis along the extrusion axis. These bars demonstrate great utility for these polymers in structural applications where stiffness coupled with toughness are extremely desirable properties.

Plasticizers may be used to assist in the formation of shaped articles from those polyesters and copolyesters which exhibit high melting point and/or high values of inherent viscosity. Useful plasticizers include diphenyl ether, benzyl benzoate, and 2,4,6-trichlorophenol.

MEASUREMENTS AND TESTS

X-ray Orientation Angle: The orientation angle (O.A.) values reported herein are obtained by the procedures described in Kwolek U.S. Pat. No. 3,671,542, using Method Two of that patent. Shown parenthetically after each O.A. value in the examples is the position, 2θ (degrees), of the specific arc used to determine the O.A. value.

Inherent Viscosity: Inherent viscosity ($\eta$inh) is defined by the following equation:

$$\eta inh = \frac{\ln (\eta rel)}{C}$$

wherein ($\eta$rel) represents the relative viscosity and C represents a concentration of 0.5 gram of the polymer in 100 ml of solvent. The relative viscosity ($\eta$rel) is determined by dividing the flow time in a capillary viscometer of the dilute solution of the polymer by the flow time for the pure solvent. The dilute solutions used herein for determining ($\eta$rel) are of the concentration expressed by (C), above; flow times are determined at 30° C; the solvent is a mixture of trifluoroacetic acid/methylene chloride (60/40, V/V).

Fiber Tensile Properties: Filament and yarn properties are measured by the procedures shown in Morgan U.S. Pat. No. 3,827,998. Tenacity, T, and Modulus, Mi, are given in grams per denier. Elongation, E, is given in percent. At least three breaks are averaged.

It should be noted that different values are obtained from single filaments (filaments properties) and from multifilament strands (yarn properties) of the same sample. Unless specific otherwise all properties given herein are filament properties.

Optical Anisotropy: Optical anisotropy may be measured by the TOT method described herein.

Spin Stretch Factor: The spin stretch factor is defined as follows:

$$S.S.F. = \frac{\text{Velocity of yarn at wind-up (ft/min)}}{\text{Velocity of melt through spinneret (ft/min)}}$$

where $$\text{Vel. of melt through spinneret} = \frac{\text{Rate of extrusion (cu ft/min)}}{\text{No. of spinneret holes} \times \text{cross-sectional area of one hole (sq ft)}}$$

TOT AND FLOW TEMPERATURE APPARATUS AND METHOD

The thermo-optical test (TOT) requires a polarizing microscope which should have strain-free optics and sufficiently high extinction with crossed (90°) polarizers to be capable of giving a background transmission specified below. A Leitz Dialux-Pol microscope was used for the determinations reported herein. It was equipped with Polaroid polarizers, binocular eyepieces, and a heating stage. A photodetector (a photometer sensor) was attached at the top of the microscope barrel. The microscope has a 32X, long working distance objective, and a Red I plate (used only when making visual observations with crossed polarizers; inserted at an angle of 45° to each polarizer). White light from an incandescent light source is directed through the olarizer, through the sample on the heating stage and through the analyzer to either the photodetector or the eyepieces. A slide permits transferring the image from eyepieces to photodetector. The heating stage used is one capable of being heated to 500° C. A "Unitron" model MHS vacuum heating stage (Unitron Instrument Co., 66 Needham St. Newton Highlands, Massachusetts 02161) was used. The photodetector signal is amplified by a photometer amplifier and fed to the Y-axis of an X-Y recorder. The system response to light intensity should be linear and the error of measurement within ± 1 mm. on the chart paper. The heating stage is provided with two attached thermocouples. One is connected to the X-axis of the X-Y recorder to record stage temperature, the other to a programmed temperature controller.

The microscope is focused visually (with crossed polarizers) on a polymer sample prepared and mounted as described below. The sample, but not the cover slip(s), is removed from the optical path. The Polaroid analyzer of the microscope is removed from the optical path, the slide is shifted to transfer the image to the photodetector and the system is adjusted to that full-scale deflection (18 cm on the chart paper used) on the Y-axis of the X-Y recorder corresponds to 36% of the photometer signal. This is done by (1) adjusting the light source intensity so that the photometer meter reads a value preselected so that it corresponds to a Y-axis reading on the recorder of 5 cm; (2) increasing the amplification of the photometer by a factor of 10. This results in the full scale recorder deflection of 18 cm corresponding to (18/50) × 100 or 36% of the photometer signal. The background transmission value is recorded with crossed (90°) polarizers and with the cover slip(s), but not the sample, in the optical path. The background transmission in the system used should be independent of temperature and should be less than about 0.5 cm on the chart paper.

The sample is preferably a 5 μm section microtomed with a diamond knife from a solid well-coalesced chip of pure polymer (e.g., as prepared in the examples, or by melting and coalescing under nitrogen some of the ground polymer) mounted in epoxy resin. For materials that shatter when microtomed, duplicate films (about 5 μm. thick) of polymer are prepared by heating a few particles of pure polymer between each of two sets of cover slips enclosed between a pair of microscope slides. By heating this assembly quickly above the flow temperature (independently determined on a polymer particle) and applying pressure with a wooden tamp alternately over each sample, thin liquid films of polymer are produced. These films solidify when cooled. One solid film between cover slips is used for the TOT procedure; the other is used for a flow temperature measurement.

The sample section is pressed flat between cover slips. One cover slip is removed and the sample on the remaining cover slip is placed (glass down) on the heating stage. The light intensity is set and the background transmission is measured as described above. The sample (section, or film between cover slips) then is positioned so that essentially all the light intercepted by the photodetector will pass through the sample. With the sample between crossed (90°) polarizers and under nitrogen, the light intensity and temperature are recorded on the X-Y recorder as the temperature is raised at a programmed rate of about 14° C/min. from 25° to 450° C. The sample temperature is obtained from the recorded temperature by use of a suitable calibration curve.

The flow temperature of (co)polymers or fibers is observed visually between crossed (90°) polarizers on the heating stage assembly previously described for the TOT procedure. Fiber samples for examination are prepared by cutting the fiber with a razor blade and mounting the samples on a cover slip. Flow temperature is that temperature at which the sharp edges of a tiny chip or particle of polymer or the cut fiber edge become rounded. If the melt viscosity is low enough, flow is observed. When a film is used in the TOT procedure, a duplicate film is used for the flow temperature determination. Flow temperature is that temperature at which the film edge change contour or the polymer flows. Observations usually are made at a heating rate of 14° C/min. In a few cases, where rapid further polymerization occurs, a faster rate, about 50° C/min, is recommended.

It should be understood that the flow temperature of these (co)polymers or fibers thereof may vary depending on their history. For example, stepwise heating ordinarily raises the flow temperature. This permits heat treatment at temperatures above the initial flow temperature but below the newly attained flow temperature level. The reported flow temperatures are those determined by these procedures.

INTENSITY TRACES

The melt-forming (co)polymers useful for fibers in this invention are considered to form anisotropic melts according to the thermooptical test (TOT) if, as a sample is heated between crossed (90°) polarizers to temperatures above its flow temperature, the intensity of the light transmitted through the resulting anisotropic melt gives a trace whose height (1) is at least twice the height of the background transmission trace on the recorder chart and is at least 0.5 cm greater than the background transmission trace, or (2) increases to such values. Curve B of the Figure illustrates a type of intensity trace usually obtained for systems for forming anisotropic melts.

The intensity of light transmitted through the analyzer when isotropic melts (the sample should be completely melted) are placed between crossed (90°) polarizers is essentially that of the background transmission (that obtained when the sample but not the cover slip is outside the field of view with 90° crossed polarizers). As the melt forms, the intensity of the light transmission (1) is essentially that of the background transmission or (2) decreases to such values from a higher value. Curve A of the Figure illustrates an intensity trace of a polymer forming an isotropic melt.

EXAMPLE 1

This example illustrates the preparation of anisotropic melt-forming copoly(chloro-1,4-phenylene terephthalate/1,4-cinnamate) (1/2) and the properties of high strength fibers thereof.

In a polymer melt tube equipped with a sidearm, nitrogen bleed tube, micro-adapter, and distillate collection tube are added chlorohydroquinone diacetate (6.84 g., 0.03 mole), terephthalic acid (4.98 g., 0.03 mole), p-acetoxycinnamic acid (12.36 g., 0.06 mole) and 0.0015 g. magnesium ribbon as catalyst. The melt tube is evacuated and is filled with nitrogen. The tube and contents are heated under nitrogen for about 1.5 hours in a vapor bath at 283° C.; the acetic acid by-product is collected in the collection tube. There is obtained a light yellow, somewhat viscous melt. The melt is then heated at 302° C. for about 0.5 hour (nitrogen flow is maintained). The nitrogen stream is then halted and the contents of the tube placed under vacuum (slow nitrogen bleed present) at 302° C. for about 0.5 hr. On cooling, there is obtained a tough, coherent plug of the copolymer weighing 13.65g. The melt of the copolymer exhibits optical anisotropy.

A melt spun fiber exhibits T/E/Mi/Den. = 3.5/1.2/352/7.0; O.A. = 20° (19.9°).

EXAMPLE 2

Illustrated in this example is the preparation of copoly(1,4-benzoate/1,4-cinnamate) (1/1) and the properties of high strength fiber thereof.

In a polymerization apparatus similar to that described in Example 1 but of larger dimensions, are placed p-acetoxybenzoic acid (45 g., 0.25 mole), p-acetoxycinnamic acid (51.5 g., 0.25 mole), and magnesium (0.01 g.), and antimony trioxide (0.01 g.) as catalysts. These ingredients are heated at 202° C to form a light, amber-colored melt. The temperatue is then raised to 255° C. and maintained thereat for 1 hour (nitrogen atmosphere), during which time the acetic acid generated is collected. The temperature is then raised to 283° C. and kept thereat for 0.5 hour (nitrogen atmosphere).

Thereafter, the melt is heated an additional 1.5 hours at 283° C under vacuum (1–2 mm Hg). The melt viscosity increases. After the melt is collected and cooled, there is obtained 61.7 g. of copolymer, ηinh = 3.2. The copolymer flows at 193° C and exhibits optical anisotropy (TOT).

A melt spun fiber exhibits T/E/Mi/Den. = 3.0/1.8/284/8.2; O.A. = 16° (20.4°).

EXAMPLE 3

This example illustrates the preparation of poly (chlori-p-phenylene hexahydroterephthalate) and strong, oriented, heat treated fibers thereof.

Chlorohydroquinone diacetate, 18.29 g. (0.08 mole), is combined with 13.78 g. (0.08 mole) transhexahydroterephthalic acid, and 0.0012 g. of anhydrous sodium acetate (as a catalyst) under nitrogen in a polymer tube equipped with a helical glass stirrer, a nitrogen inlet tube, and a sidearm attached in turn to an adapter, a fraction cutter and a collection flask. The tube and contents under nitrogen flow are heated with stirring for 1 hour at 283° C. The acetic acid by-product is collected. The cloudy polymer melt, without stirring, is subsequently heated for 10 min. at 283° C. during which time the pressure is reduced to 0.2 mm. Hg. The melt then is heated at 305° C. and 0.2 mm. Hg. for an additional 25 minutes with no stirring to complete the polymerization. The optically ahnisotropic melt which forms is cooled and the polymer isolated. There are obtained 21 g. of polymer.

A plug of the above polymer is molded at 280° C. and placed in a melt spinning cell with a spinneret assembly consisting of a single hole spinneret, 0.009 inch (.023 cm.) in diameter, and 19 filter screens (mesh size varies from 50 to 325), and a disc of Dynalloy filter material (X-5), a product of Fluid Dynamics Co., Morristown, N.J., all tamped into place. The plug is melted (melt zone temperature is 328° C. to 342° C.) and extruded through the spinneret assembly, maintained at 316° C. to 322° C., into air. The fiber is wound up at 549 to 1,006 m./min. Several bobbins of fiber are collected. As-spun filament extruded at 342° C. melt zone temperature and 322° C. spinneret temperatue, with a wind up rate of 885 m./min. and a SSF of 102, exhibits T/E/Mi/Den. = 4.7/2.1/174/3.4, O.A. = 11°(18°).

A relaxed skein of this fiber of tenacity 4.7 is heat treated in an insulated oven which is swept with a stream of nitrogen (100 ft.³/hr.; incoming nitrogen temperature is 25° C.) under the following successive conditions: 1 hr./170° C.; 1 hr./230° C.; 2 hr./260° C.; and 0.75 hr./290° C. The filament tensile properties exhibited by the treated fiber are: T/E/Mi/Den. = 11.0/2.8/249/3.7, O.A. = 11° (18°).

EXAMPLE 4

This example illustrates the plasticized melt spinning of a high viscosity sample of poly(chloro-1,4-phenylene hexahydroterephthalate).

A 90/10 wt/wt mixture of poly(chloro-1,4-phenylene/2,5-dichloro-1,4-phenylene transhexahydroterephthalate) (96/4) (prepared by the general melt polymerization methods described herein) and 2,4,6-trichlorophenol (b.p. = 246° C) is prepared and molded into a plug at 280° C. The plug is melt spun through a spinning unit; melt zone temperature is 315° C. The anisotropic melt is extruded into air through a 5-hole spinneret [each hole of 0.007 inch (0.018 cm.) diameter; temperature is 340° C.; pack contains these screens (no./mesh): 7/50, 10/200, 3/325]. The fibers are wound up at 490 yd./min. (448 m./min.). The 25 denier yarn exhibits T/E/Mi = 5.3/2.1/211, O.A. = 13° (17.6°). The spinneret temperature of 340° C. is 20° C. lower than that required to spin this polymer without added plasticizer.

EXAMPLE 5

This example illustrates the preparation of a terpolymer within the scope of this invention, terpoly-(chloro-1,4-phenylene hexahydroterephthalate/1,4-benzoate/1,4-cinnamate) (1/1/1), plus fibers spun from an anisotropic melt thereof.

In a polymerization apparatus are combined chlorohydroquinone diacetate (8.00 g., 0.035 mole), trans-hexahydroterephthalic acid (6.03 g., 0.035 mole), 4-acetoxybenzoic acid (6.31 g., 0.035 mole), 4-acetoxy cinnamic acid (7.21 g., 0.035 mole), antimony troxide (0.001 g.), and magnesium (0.0005 g). These stirred ingredients, under nitrogen, are heated at 255° C. for 3 hours; 3.9 ml. of acetic acid by-product are collected. The reaction mass is heated at 255° C. for 2⅜ hours under reduced pressure, then for 0.5 hour under nitrogen at 255° C. The terpolymer obtained weighs 15.4 g. (ηinh = 3.73), and flows at 143° C. The product (melt) is anisotropic above 143° C. and is strongly birefringent above 200° C. (TOT).

A sample of the terpolymer is extruded through a 1-hole spinneret [hole diameter = 0.009 inch (0.023 cm.), temperature: spinneret: 218° C, melt zone: 215° C.; Screens (no./mesh) = 6/50 3/325, 10/200] and wound up at 120 yd./min. (110 m./min.) to yield a fiber with T/E/Mi/Den. = 2.9/1.8/200/30; O.A. = 21° (19.2°).

EXAMPLE 6

This example illustrates the preparation of poly-(chloro-1,4-phenylene terephthalate/4,4'-bibenzoate) (70/30), an anisotropic melt thereof and strong stiff as-spun and heat treated fibers prepared therefrom.

In a polymer tube equipped with a nitrogen inlet port, stirrer, and sidearm leading to a condenser and collection tube is placed chlorohydroquinone diacetate (22.8 g., 0.10 moles), terephthalic acid (11.6 g., 0.07 moles) and 4,4'-bibenzoic acid (7.3 g., 0.03 moles). The tube and stirred contents are purged with nitrogen for 30 minutes, then heated at 340° C. with stirring under nitrogen for 42 minutes; a homogeneous dark brown melt forms and the by-product acetic acid is collected. The pressure on the melt now is reduced to 1.7 mm. Hg within 6 min. and kept at this pressure an additional 1 min. The polymer is cooled, isolated and extracted in boiling acetone for one hour. There is obtained 21.5 g. of polymer which exhibits optical anisotropy above the flow temperature.

A plug of this polymer is extruded through a one hole, (0.020 cm. in diameter) heated capillary spinneret [equipped with filter screens (no/mesh) (2/50, 2/100, 1/325), temperature 332° C, melt zone temperature, 322° C] into air and would up at 229 m./min. A filament exhibits these properties: T/EMi/Den. = 3.9/0.8/518/14; O.A. = 18° (18.3°).

Filaments of this fiber wrapped on a "Fiberfrax" covered bobin are heated in an oven swept by nitrogen under the following conditions: room temperature to 218° C. for 1 hr., 218°–246° C./1.3 hrs., 246°–272° C./2 hrs., cooled to 75° C., then 75° C.–294° C/0.5 hr., 294° C./1.5 hrs. The heat treated fiber exhibits these properties: T/E/Mi/Den. = 9.5/2.3/472/17.

EXAMPLE 7

This example illustrates the preparation of strong fibers of poly(2-chloro-1,4-phenylene terephthalate/2,6-naphthalate) (7/3).

In a 2 liter resin kettle equipped with a Hastelloy stirrer, nitrogen inlet port, and fractionating column with variable reflux distillation head and collection flask is placed 733.9 g (3.21 moles) of 2-chloro-1,4-phenylene diacetate, 348.9 g (2.10 moles) of terephthalic acid, and 194.6 g (0.90 moles) of 2,6-naphthalenedicarboxylic acid. The mixture is purged with dry nitrogen at 25° C and is heated to 300° C under nitrogen flow in a Woods metal bath. Stirring is started after 16 minutes. Distillate is collected after 30 minutes. The mixture is heated at 300° C for a total of 129 minutes, whereupon the system is evacuated to a pressure of 380 mm Hg and the temperature is raised to 330° C over 14 minutes. The pressure is reduced further to about 10 mm.Hg in 11 minutes while slowly reducing the nitrogen flow to zero. The pressure is 2.0 mm Hg after an additional 3 minutes, 1.3 mm Hg after 3 more minutes and remains thereat for a further 4 minutes, all at 330° C with stirring. The vacuum is released with nitrogen, stirring is stopped, and the light tan molten polymer is poured into an ice water bath. A total of 787 g of polymer and 384 g of distillate are collected. The polymer is extracted in hot acetone. It forms an anisotropic melt above its TOT flow temperature of 302° C.

The polymer is melted in a single screw melting machine with a melt zone temperature of 325° C and is spun through a 34-hole spinneret (with 0.013 cm holes of 0.051 cm length) at 325° C into ambient air and is wound up at 320 m/mi (spin stretch factor = 27). The 34 filament yarn exhibits a T/E/Mi/Den. of 6.6/1.8/547/193; orientation angle = 21° (17.7°).

The above yarn (1143 m) is plied 3 times, coated with Alcon C® fumed alumina (Cabot Corporation) and backwound onto a bobbin covered with Fiber-Frax®. The bobbin is placed in an insulated oven which is purged at room temperature continuously with a stream of nitrogen at a rate of 300 SCFH. The oven (and nitrogen by an attached preheater) is heated to a temperature of 260° C over a period of 2 hours and is held at temperatures of 260° C to 280° C for about 2½ hours, then is heated to 290° C and is held at 290° C for 13 hours, whereupon the oven and nitrogen heaters are turned off and the sample allowed to cool slowly to 25° C over a period of several hours in the nitrogen-swept oven. The yarn exhibits a T/E/Mi/Den. of 30.44/4.7/527/582, and an X-ray orientation angle of 18° (22.3°).

EXAMPLE 8

This example illustrates the preparation of strong fibers of poly(2-methyl-1,4-phenylene terephthalate/2,6-naphthalate) (7/3).

In a 1 liter resin kettle equipped with a stirrer, nitrogen inlet port, and fractionating column with variable reflux distillation head and collection flash is placed 164.4 g (0.79 mole) of 2-methyl-1,4-phenylene diacetate, 87.2 g (0.53 mole) of terephthalic acid, and 48.7 g (0.23 mole) of 2,6-naphthalenedicarboxylic acid. The mixture is purged with dry nitrogen at 25° C and is heated rapidly to 300° C under nitrogen flow. Stirring is begun 10 minutes after start of heating; distillate is collected after 43 minutes; 33 minutes after the start of heating the temperature of heating is raised to 315° C and is maintained thereat for about an additional hour. The temperature then is increased to 345° C over a period of about 10 minutes and the pressure is decreased to about 380 mm Hg. Thereafter, the pressure is decreased to about 1 mm Hg in 16 minutes. The pressure is held at about 1 mm Hg for an additional 35 minutes. The vacuum is released with nitrogen and the molten polymer is poured into ice water. There is collected 172.5 g of polymer and 88.4 g of distillate. The polymer is extracted in refluxing acetone for 2 hours; it forms an anisotropic melt (TOT) above its flow temperature of 301° C.

A plug of polymer is placed in a melt spinning cell equipped with 6 screens (mesh varies from 20 to 325). The plug is melted with a melt zone temperature of 325° C and the anisotropic melt is extruded through a 10-hole spinneret (at 335° C) with 0.023 cm diameter holes of 0.046 cm length, into ambient air. The fibers are wound up at 336 m/min (spin stretch factor = 56). The 10 filament yarn after plying 20 times has a T/E/Mi/Den. ratio of 5.5/1.6/430/1159 (5 inch gage length); X-ray orientation angle = 24° (19.4°).

A sample of plied yarn is backwound into a perforated metal basket. The basket then is placed in an insulated oven (heated at 295°–300° C) which is continuously purged by a stream of nitrogen flowing at about 120 SCFH and preheated to near the oven temperature. The sample is kept in the oven under nitrogen at 295°–300° C for 4.5 hours, after which time it is immediately removed from the hot oven. The heat treated yarn has a T/E/Mi/Den. of 20.2/4.4/355/1110 (5 inches gage length) and an X-ray orientation angle = 22° (19.3°).

In Tables 1–4 (Examples 9–12) are shown compositions, melt anisotropy, and fiber data for additional polyesters and copolyesters of this invention, prepared by procedures equivalent to or similar to those shown in Examples 1–8. Each species exhibits optical anisotropy (TOT) in the melt. In all instances, units I and II, if present, are present in substantially equimolar amounts. In Table 1, Itemms 1–4 are homopolyesters, while Items 5–11 are copolyesters wherein the two "II" units are derived from the two different acids employed. The as-spun fiber of Item 10 of Table 1 was loosely piled into a perforated metal basket, which was placed in an oven and heated with continuous passage of nitrogen over the filaments. It was first heated to about 300° C and 0.7 hr and then over about a 2-hour period of 320° C and held there for 1.3 hr. The properties of the heat treated product measured on 10 inch filaments were T/E/Mi/O.A = 16/3.4/483/17° (16.5°). The as-spun filber (Item 3 of Table 4) was heated successively for 1 hour at 280° C, 290° C, 300° C and 310° C (in a loose package similar to Item 10 of Table 1). Yarn properties were T/E/Mi/O.A. = 12/2.1/553/15° (19.4°).

Table 1
EXAMPLE 9

Formula Recurring Units: I. —O—R$_1$—O—    II. —C(=O)—R$_2$—C(=O)—

| Item | R$_1$ | R$_2$ | Flow Temp. °C | η inh | Fiber (as-spun) T | E | Mi | O.A. | 2θ |
|---|---|---|---|---|---|---|---|---|---|
| 1 |  Br |  | 275 | | 3.2 | 2.4 | 141 | 12° | 20.8° |
| 2 |  CH$_3$ | " | 381 | | 1.0 | 2.0 | 54 | 26° | 18.4° |
| 3 |  Cl | 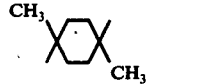 CH$_3$, CH$_3$ | 316 | | 2 | 21 | 45 | 28° | 13.8° |
| 4 | " | 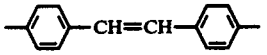 —CH=CH— | 323 | | | | | | |
| 5 |  CH$_3$ | 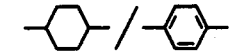 (80/20) | 320 | | 0.8 | 3.3 | 43 | 33° | 18.2° |
| 6 |  Cl | 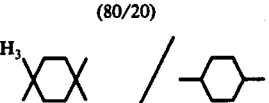 CH$_3$, CH$_3$ (80/20) | 306 | 2.5 | 5.4 | 10.6 | 44 | 16° | 14.4° |
| 7 | " | " (5/95) | 322 | 3.3 | 2 | 2 | 121 | 17° | 20.9° |
| 8 | " | 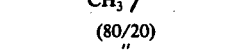 (80/20) | 278 | | 8.0 | 2.6 | 382 | 13° | 18.5° |
| 9 | 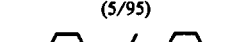 Cl |  (67/33) | 268 | | 1.6 | 1.3 | 164 | 22° | 18.5° |
| 10 | 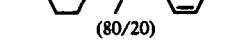 CH$_3$, CH$_3$ |  (70/30) | 306 | 1.7 | 4.9 | 1.6 | 418 | 35° | 16.4° |
| 11 | 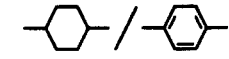 Cl |  (90/10) | 263 | 1.8 | (10 in. filaments) 3.2 | 2.5 | 171 | 17° | 18.0° |

Table 2
EXAMPLE 10

Formula Recurring units: I. —O—R$_1$—O—   II. —C(=O)—R$_2$—C(=O)—   and   III. —C(=O)—C$_6$H$_4$—O—

| Item | R$_1$ | R$_2$ | η inh | Flow Temp. °C | Fiber (as-spun) T | E | Mi | O.A. | 2θ |
|---|---|---|---|---|---|---|---|---|---|
| 1* | 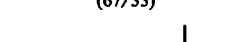 Cl, Cl | Cl | | 196 | | | | | |
| 2** | " |  Cl, Cl  | 2.4 | 175 | 2.8 | 2.2 | 165 | 20° | 18.6° |
| 3* | " | " | 1.8 | 224 | 1.7 | 0.9 | 208 | 21° | 18.7° |
| 4* | 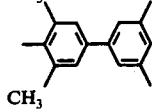 CH$_3$, CH$_3$, CH$_3$, CH$_3$ |  Cl, Cl | 1.1 | 248 | 0.9 | 0.4 | 208 | 25° | 16.7° |

Table 2-continued
EXAMPLE 10

Formula Recurring units: I. —O—R$_1$—O—  II. $-\overset{O}{\underset{\|}{C}}-R_2-\overset{O}{\underset{\|}{C}}-$ and III. $-\overset{O}{\underset{\|}{C}}-\phenyl-O-$

| Item | R$_1$ | R$_2$ | ηinh | Flow Temp. °C | T | E | Mi | O.A. | 2θ |
|------|-------|-------|------|---------------|---|---|-----|------|------|
| 5* | " | —⬡— | 2.4 | 204 | 2.4 | 1.4 | 189 | 34° | 17.8° |

*Mol ratio of unit III to unit I is 2:1
**Mol ratio of unit III to unit I is 1:2.

Table 3
EXAMPLE 11
Formula Recurring Units:

I. —O—(Cl-phenyl)—O—

II. $-\overset{O}{\underset{\|}{C}}-R_2-\overset{O}{\underset{\|}{C}}-$ and

III. $-O-\phenyl-\overset{H}{C}=\overset{H}{C}-\overset{O}{\underset{\|}{C}}-$

| Item | R$_2$ | ηinh | Flow Temp. °C |
|------|-------|------|---------------|
| 1* | —⌬— | 1.8 | 235 |
| 2** | —⬡— | 2.1 | 258 |

*Mol ratio of unit III to unit I is 2:1
**Mol ratio of unit III to unit I is 0.46:0.54.

Table 4
EXAMPLE 12

Formula Recurring Units: I. —O—R$_1$—O—  II. $-\overset{\|}{\underset{O}{C}}-R_2-\overset{\|}{\underset{O}{C}}-$ where part of —O—R$_1$—O— is replaced by

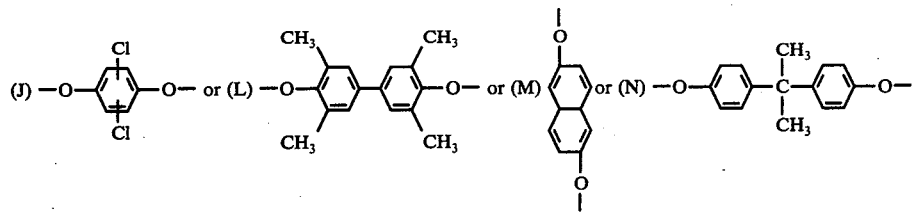

| Item | R$_1$ | J | L | M | N | Mole Ratio of —O—R$_1$—O— to J, L, M or N | R$_2$ | ηinh | T | E | Mi | O.A. | 2θ | Flow Temp. °C |
|------|-------|---|---|---|---|---------|-------|------|-----|-----|-----|------|------|-------|
| 1 | Cl-phenyl | X | | | | 95.4/4.6 | —⬡— | | 6.3 | 2.4 | 236 | 11° | 17.7° | 312 |
| 2 | Cl-phenyl | X | | | | 67/33 | —⬡— | 1.6 | 2.5 | 1.8 | 168 | 25° | 17.6° | 241 |
| 3 | CH$_3$-phenyl | X | | | | 70/30 | —⬡— | | 3.8 | 0.8 | 505 | 17° | 19.2° | |
| 4 | (CH$_3$)$_2$-phenyl | X | | | | 70/30 | " | | 4.4 | 1.3 | 378 | 26° | 16.4° | 333 |
| 5 | Cl-phenyl | | | X | | 95/5 | —⬡— | | 3.6 | 2.3 | 159 | 12° | 17.8° | 305 |

I claim:

16. A shaped article of the copolyester of claim 10.

17. A copolyester according to claim 10 wherein X is methyl, n is one, Y is 2,6-naphthylene and the ratio of

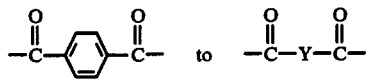

units is 70:30.

18. The (co)polyester of claim 3 wherein $R_1$ is substituted with a member of the group consisting of chloro, bromo, fluoro, or lower alkyl substituents.

19. A fiber-forming, melt spinnable copolyester capable of forming an optically anisotropic melt and consisting essentially of recurring units selected from the group consisting of $$-O-R_1-O- \quad \text{I}$$

and

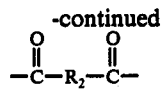

wherein $R_1$ and $R_2$ are radicals selected from the group of 1) single and fused six-membered aromatic carbocyclic ring systems wherein the chain extending bonds of the ring system, if attached to the same ring, are positioned 1,4- to each other, and if attached to different rings, are in positions parallel and oppositely directed, and 2) multiple six-membered aromatic carbocyclic rings systems in which the individual rings are joined by a chemical bond or a trans-vinylene group, and in which the chain extending bonds of each ring are in the 1,4-positions; and with the proviso that $R_1$ is substituted, and up to 25 mol % of other aromatic polyester-forming units based on the total of such units I and II and wherein the I units and their replacements and the II units and their replacements are present in substantially equimolar amounts, said copolyester having a flow temperature in the range of 200° C to 375° C.

20. The copolyester of claim 19 in which up to 5 mol % of other aromatic polyester-forming units based on the total of units I and II is present.

* * * * *

UNITED STATES PATENT OFFICE
CERTIFICATE OF CORRECTION

PATENT NO. : 4,118,372

Page 1 of 3

DATED : October 3, 1978

INVENTOR(S) : John Raymond Schaefgen

It is certified that error appears in the above-identified patent and that said Letters Patent are hereby corrected as shown below:

In the Abstract, line 2, "anisotrophy" should read --anisotropy--.

Column 1, line 30, "coopolyesters" should read --copolyesters--.

Column 5, line 21, after "molten" and before "mass" insert --polymer--; line 57, "anistropy" should read --anisotropy--.

Column 6, line 8, "moltem" should read --molten--.

Column 7, line 23, before "inch of notch" insert --per--; line 51, "20" should read --2θ--.

Column 8, line 7, "(filaments properties)" should read --(filament properties)--; line 9, "specific" should read -- specified--; line 42, "olarizer" should read --polarizer--; line 64, "to" should read --so--.

Column 9, line 56, "edge" should read --edges--.

Column 10, line 14, after "systems" and before "forming" delete "for".

Column 11, lines 11 and 12, "chlori-p-phenylene" should read --chloro-p-phenylene--; line 28, "ahnisotropic" should read --anisotropic--; line 35, after "Dynalloy" insert --®--.

UNITED STATES PATENT OFFICE
CERTIFICATE OF CORRECTION

PATENT NO. : 4,118,372
DATED : October 3, 1978
INVENTOR(S) : John Raymond Schaefgen It is certified that error appears in the above-identified patent and that said Letters Patent are hereby corrected as shown below:

Column 12, line 18, "troxide" should read --trioxide--; line 60, "T/EMi/Den" should read --T/E/Mi/Den.--.

Column 13, line 56, "30.44/4.7/527/582" should read --30.4/4.7/527/582--.

Column 14, line 41, "inches" should read --inch--; line 52, "Itemms" should read --Items--; line 59, "and" should read --in--; line 60, "of" should read --to--; line 63, "filber" should read --fiber--.

Column 15, Table 2, Item 4,

" 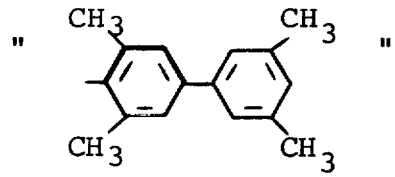 " should read -- 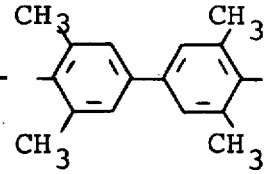 --.

Column 18, Table 4, in the heading, after "(M)" and before "or"

" 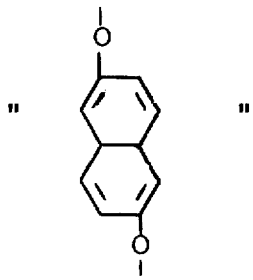 " should read -- 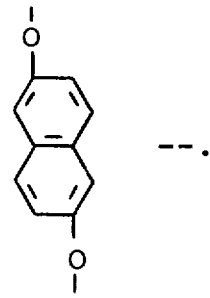 --.

UNITED STATES PATENT OFFICE
CERTIFICATE OF CORRECTION

PATENT NO. : 4,118,372

DATED : October 3, 1978

INVENTOR(S) : John Raymond Schaefgen

It is certified that error appears in the above-identified patent and that said Letters Patent are hereby corrected as shown below:

Claim 1, line 13, "siz" should read --six--.

Claim 5, lines 38 and 39, "4,4'-phenylene" should read --4,4'-biphenylene--; line 39, "1.4" should read --1,4--.

Claim 13, line 20,

" 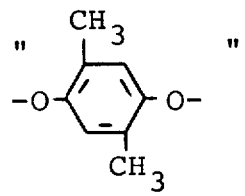 " should read -- 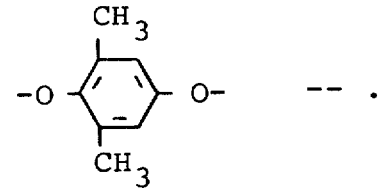 -- .

Claim 15, line 65,

" 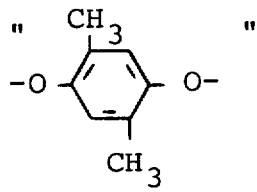 " should read -- 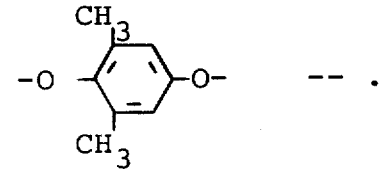 -- .

Signed and Sealed this

Seventeenth Day of April 1979

[SEAL]

Attest:

RUTH C. MASON
Attesting Officer

DONALD W. BANNER
Commissioner of Patents and Trademarks